April 15, 1958
A. J. WANTENAAR
2,830,678
LUBRICATOR, ESPECIALLY FOR STEAM
ENGINES, COMPRESSORS, PUMPS
OR THE LIKE
Filed Aug. 30, 1954
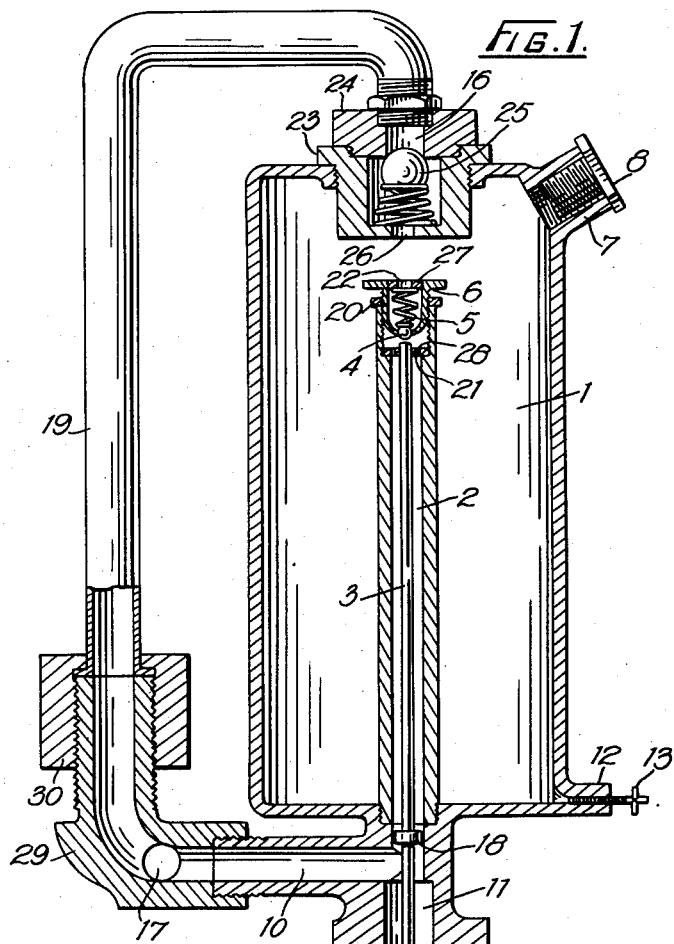
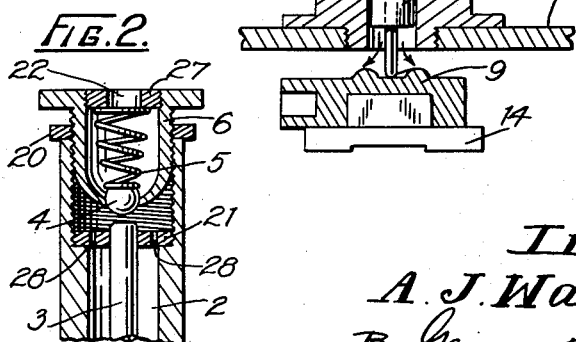
Inventor
A. J. Wantenaar
By Clement Downing Rubold
Attys.

United States Patent Office 2,830,678
Patented Apr. 15, 1958

2,830,678

LUBRICATOR, ESPECIALLY FOR STEAM ENGINES, COMPRESSORS, PUMPS OR THE LIKE

Abraham Jacobus Wantenaar, Salisbury, Southern Rhodesia

Application August 30, 1954, Serial No. 452,840

4 Claims. (Cl. 184—55)

The invention refers to a new lubricator especially for steam engines of all types, compressors, pumps etc. Lubricators used generally for steam engines are not economical because the lubricant is continually discharged from the lubricator and therefore an excessive quantity of lubricant is wasted. The object of the invention is a new lubricator from which the lubricant is intermittently discharged so that only the necessary quantity of lubricant is used with the result that a very considerable saving in lubricating material and an effective lubrication is achieved.

According to the invention the lubricator consists essentially of a container in which a cylinder is arranged one end of which can be closed and opened by a valve, preferably ball valve; the valve is actuated by means of a rod arranged inside the cylinder. Every time the rod is pressed against the valve, the latter is opened and a small quantity of lubricant is discharged from the container through the cylinder into the engine, compressor parts or the like. In order to ensure the flow of the lubricant through the cylinder pressure and vacuum both created by steam or other condensable steam containing fluid is applied as will be described below. A further valve is provided for the steam-inlet passage to prevent lubricant from flowing into the steam pipe.

An example of the lubricator according to the invention is shown diagrammatically in the drawing. Fig. 1 shows the lubricator in vertical section and Fig. 2 the control valve in larger scale also in vertical section.

As shown in the drawing, the lubricator consists essentially of the following parts: A container 1 in which a cylinder 2 is arranged; a rod 3 which can be moved up and down in cylinder 2 to be pressed against a valve consisting of a ball 4 and spring 5 held in a cage 6 which is screwed into the upper end of cylinder 2 (Fig. 2). Oil, grease or other lubricant is filled into the container 1 through pipe 7 which is closed by screw cap 8.

The lower end of rod 3 is protruding from the lubricator and it is actuated by a cam-like part 9 the upper surface of which is provided with rounded raised sections so that by reciprocating the part 9 rod 3 is raised or lowered intermittently and the ball valve 4, 5 is opened and closed respectively. While ball 4 is lifted a small quantity of lubricant is allowed to flow through the upper opening of cylinder 2 into the latter and the lubricant leaves the cylinder at its lower end—as shown by arrows—and flows to the engine parts to be lubricated. In order to ensure the flow of lubricant into the upper opening of cylinder 2 steam or other condensable steam containing fluid is applied. The condensed steam floats the lubricant on its surface so that the lubricant flows into the cylinder. For this purpose steam is led under pressure from an inlet pipe 17 through a connecting pipe 19, passage 16, ball valve 25 and opening 26 into the container 1 and also through passage 10 into chamber 11 surrounding the lower section of rod 3. In this way a double action is obtained because the steam entering through passage 16 is pressing against the lubricant and at the same time vacuum created by steam in chamber 11 will produce a sucking action.

Part 9 is operated either by hand or it is connected in any suitable way to a reciprocating part 14 of the engine that is in case part 9 is hand-operated a certain quantity of lubricant will leave the lubricator each time part 9 is actuated or if part 9 is connected to a reciprocating part of the engine the lubricator will work at each back and forward stroke of the engine.

As indicated in Fig. 2, the valve clearance can be adjusted by screwing cage 6 higher or lower in the upper end of the cylinder; the position of the cage 6 is secured by means of nut 20. The central top opening of cage 6 is closed by a threaded disc 27 which has a central passage 22; the disc can be readily removed if required.

Short cylindrical parts 18 are fixed to rod 3 to guide the rod in cylinder 2. Between parts 18 and the inner surface of cylinder 2 there is enough clearance left for the passage of lubricant. As a further guide for the upper end of rod 3 a disc 21 is provided which has holes 28 through which the lubricant can pass.

The inlet valve 25 consisting of ball and spring is held in a cage 23 screwed into the top opening of container 1. Into cage 23 is screwed a connecting block 24 to which is attached steam pipe 19. Thus the steam is pressed into container 1 through passage 16 of block 24, cage 23 and passage 26 of cage 23.

Pipe 19 is connected to the lubricator body by means of a bent pipe section 29 and nut 30. Container 1 can be drained at drain pipe 12 which is closed by plug 13. The lubricator is held on an arm or plate 15.

What I claim is:

1. A lubricator especially for steam engines, compressors, pumps or the like, comprising a container for the lubricant, a cylinder extending into the container from the lower end thereof, said cylinder communicating at its upper end with the interior of the container, a valve controlling the upper end of the cylinder, a rod located within the cylinder for actuating said valve, means located exterior to the cylinder and engaging the lower end of the rod to reciprocate the rod and actuate the valve and permit intermittent flow of the lubricant into the cylinder, a conduit communicating respectively with the upper end of the container and the lower end of the cylinder, and means for introducing steam or other condensable steam containing fluid under pressure into said conduit to provide a pressure in the container above the lubricant and a vacuum in the cylinder whereby condensed steam floats the lubricant on its surface so that the lubricant flows into the cylinder when the valve is actuated.

2. A lubricator as claimed in claim 1, wherein valve means are provided for controlling the communication between said conduit and the container.

3. A lubricator as claimed in claim 1, wherein the valve is mounted in an adjustable cage which is screwed into the upper end of the cylinder.

4. A lubricator as claimed in claim 1 wherein the means located exterior of the cylinder engaging the end of the rod comprises a cam member.

References Cited in the file of this patent

UNITED STATES PATENTS

| | | |
|---|---|---|
| 127,161 | Ficht | May 28, 1872 |
| 1,080,710 | Mayfield | Dec. 9, 1913 |
| 1,187,528 | Howard | June 20, 1916 |
| 1,536,010 | Johnson | April 28, 1925 |
| 2,175,455 | Cousins et al. | Oct. 10, 1939 |
| 2,187,241 | Kehle | Jan. 16, 1940 |
| 2,223,700 | Norgren | Dec. 3, 1940 |